United States Patent Office 3,144,586
Patented Aug. 11, 1964

3,144,586
PROTECTIVE RELAY ASSEMBLIES
John C. Gambale, Livingston, N.J., assignor to Westinghouse Electric Corporation, East Pittsburgh, Pa., a corporation of Pennsylvania
Filed Aug. 15, 1962, Ser. No. 216,999
9 Claims. (Cl. 317—36)

This invention relates to relay assemblies and it has particular relation to protective time-delay relay assemblies employing static components.

Protective relay assemblies frequently are employed wherein the relay assemblies operate with time-delays inversely dependent on variable quantities such as a voltage or current present in an electric system to be protected. For proper coordination of a number of protective relay assemblies employed to protect a common electric system various time curves are employed. Typical time curves will be found in Performance Data Bulletin 41-100, September 1961, pages 2 and 3, published by the Westinghouse Electric Corporation, Newark, New Jersey.

In accordance with the invention, a relay assembly employing static components is designed to provide selected time curves. For some applications, a single time-delay stage suffices to provide a desired time curve. For other applications, a plurality of time-delay stages operate in sequence to provide a desired time curve.

In a preferred embodiment of the invention, a semiconductor device such as a transistor is employed for comparing operating and restraint quantities both of which conveniently may be derived from the electric system to be protected. For predetermined relations between the operating and restraint quantities the semiconductor device operates to initiate a timing operation of the relay assembly.

The invention also contemplates the supervision of the operation of a time-delay relay assembly by a static directional element preferably employing a ring modulator for determining the direction of power flow in an electric system to be protected.

It is, therefore, an object of the invention to provide an improved relay assembly employing static components.

It is also an object of the invention to provide an improved time delay assembly employing plural-stage timing operations.

It is an additional object of the invention to provide an improved relay assembly employing static components and a static supervising element for supervising the operation of the relay assembly.

Other objects of the invention will be apparent from the following description taken in conjunction with the accompanying drawing, in which.

Figure 1:
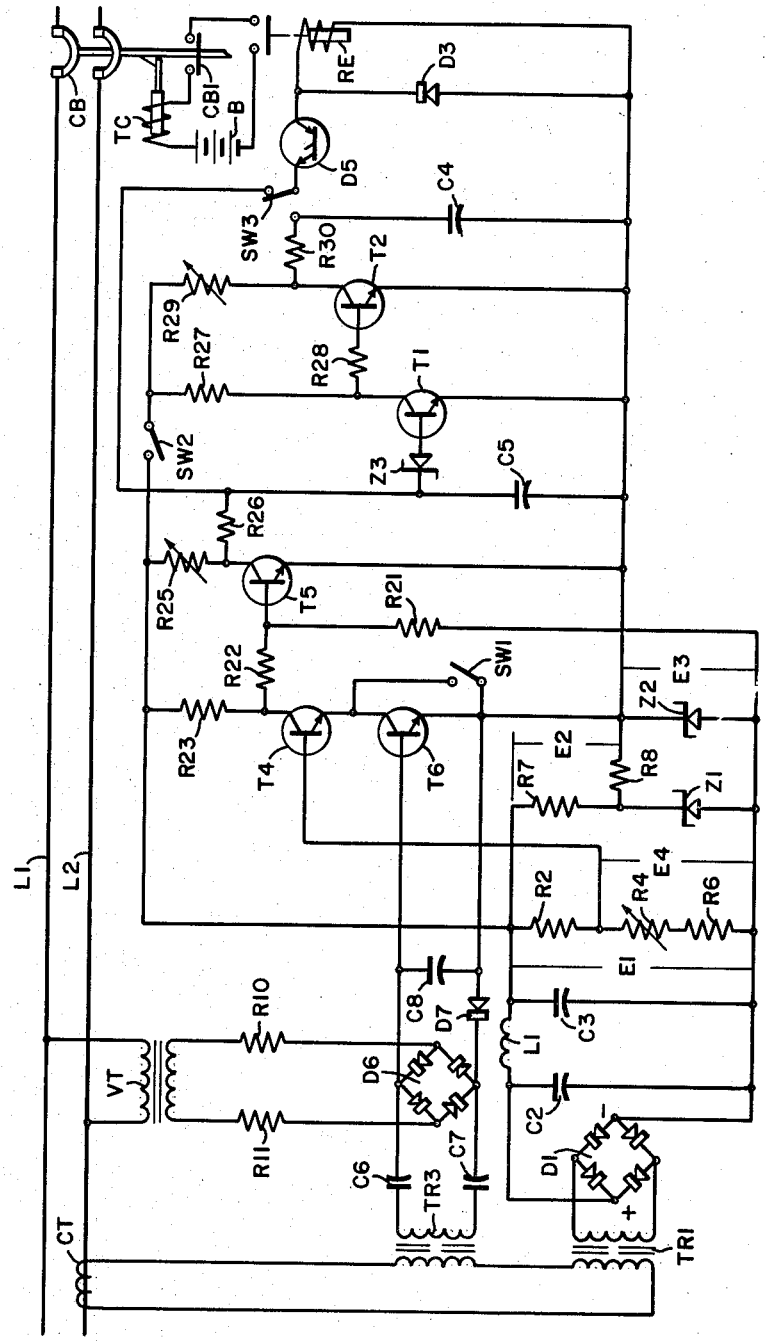
FIGURE 1 is a schematic view of a relay assembly embodying the invention.

Referring to the drawing, FIGURE 1 shows an electric system to be protected which may take any desired form. For example it may be a single phase or a polyphase electric system operating at any desired frequency. For present purposes, it will be assumed that the electric system to bt protected is a single phase transmission line having line conductors L1 and L2 and designed for operation at a power frequency such as 60 cycles per second.

The portion of the electric system shown in FIG. 1 is located at a relaying station wherein a relay assembly is employed for supervising the operation of a circuit breaker CB. Tripping of the circuit breaker CB is utilized to segregate portions of the transmission line to the right of the circuit breaker as viewed in FIG. 1 from the portion of the transmission line adjacent the relaying station. The circuit breaker CB has a trip coil TC which may be energized to trip the circuit breaker, and an auxiliary switch CB1 which is closed when the circuit breaker is closed and which is open when the circuit breaker is open. The circuit breaker CB is shown in its closed condition.

Two transformers TR1 and TR3 have their primaries connected in series with the secondary winding of a current transformer CT for energization in accordance with the line current flowing in the line conductor L2. These transformers desirably may have soft iron cores provided with air gaps to provide a more linear relation between secondary and primary currents over a substantial range of operation.

The transformer TR1 is utilized in applying a direct voltage E1 across a voltage divider comprising three resistors R2, R4 and R6 in series. The resistor R4 is shown to be adjustable. Conveniently, the secondary winding of the transformer TR1 is connected across the input terminals of a full-wave rectifier D1 which is illustrated as a bridge-type rectifier. The positive (+) and negative (−) output terminals of the rectifier are connected across the voltage divider through a filter represented by an inductance coil L1 and capacitors C2 and C3. This filter preferably has an extremely short time-delay, such as less than 3 cycles; and is utilized to remove ripple from the output of the rectifier.

The voltage E1 also is applied across a voltage divider for the purpose of obtaining two components E2 and E3. The component E2 is dependent on line current whereas the component E3 is a substantially constant voltage which is employed as a reference or restraint voltage. As shown in FIG. 1, the voltage E1 is applied across a resistor R7 and a threshold device Z1 in series. The threshold device Z1 has a characteristic such that it exhibits a large or blocking resistance to the flow of current until the voltage thereacross reaches a threshold value. For voltages in excess of the threshold value, the threshold device Z1 breaks over to exhibit a substantially constant voltage thereacross. Desirably the threshold device may take the form of a Zener diode. In an analogous manner, a resistor R8 and a threshold device such as a Zener diode Z2 are connected in series across the Zener diode Z1. Consequently, when the Zener diode Z2 breaks over a substantially constant voltage E3 appears thereacross. The voltage E2 varies in dependence on the line current flowing in the line conductor L2.

The specific connections of the relay assembly of FIG. 1 depend on the characteristics desired therefrom. For present purposes, it will be assumed that a switch SW1 is closed, a switch SW2 is open and a single-pole double-throw switch SW3 is operated to its right-hand position as shown in FIG. 1.

It will be noted that the voltage E2 is applied across a capacitor C5 through an adjustable resistor R25 and a fixed resistor R26. Consequently, the charging rate of the capacitor can be adjusted by adjustment of the resistor R25.

The effectiveness of the capacitor C5 is determined by a switch T5 which is connected across the resistor R26 and the capaictor C5. If the switch T5 is closed, the capacitor C5 is ineffective and cannot receive a charge through the charging circuit. Any charge on the capacitor is dissipated through the closed switch and the resistor R26. If the switch T5 is open, the capacitor C5 is in effective condition for receiving a charge through its charging circuit.

Preferably, the switch T5 takes the form of a transistor which is assumed to be of the NPN type. The collector of the transistor is connected to the positive terminal of the capacitor C5 through the resistor R26. The emitter of the transistor is connected to the negative terminal of the capacitor C5.

When no fault is present on the transmission line, the voltage E2 is applied across the base and emitter of the transistor T5 through resistors R23 and R22 in series for the purpose of maintaining the transistor T5 in its turned-on or conductive condition. In this condition, the transistor T5 renders the capacitor C5 ineffective for receiving a charge through its charging circuit. It will be noted that the resistors R23 and R22 together with a resistor R21 are connected in series for energization by the voltage E1. The purpose of this connection will be discussed below.

Supervision of the transistor T5 is effected by a device T4 which is responsive to the difference between an operating voltage E4 which appears across the resistors R4 and R6 and the reference voltage E3. Preferably the device T4 is in the form of a transistor which is illustrated as an NPN type transistor. By inspection of FIG. 1, it will be noted that the collector of the transistor T4 is connected through the resistor R22 to the base of the transistor T5 whereas the emitter of the transistor T4 is connected through the switch SW1 to the emitter of the transistor T5. The base of the transistor T4 is connected to a point intermediate the resistors R2 and R4.

Figure 2:
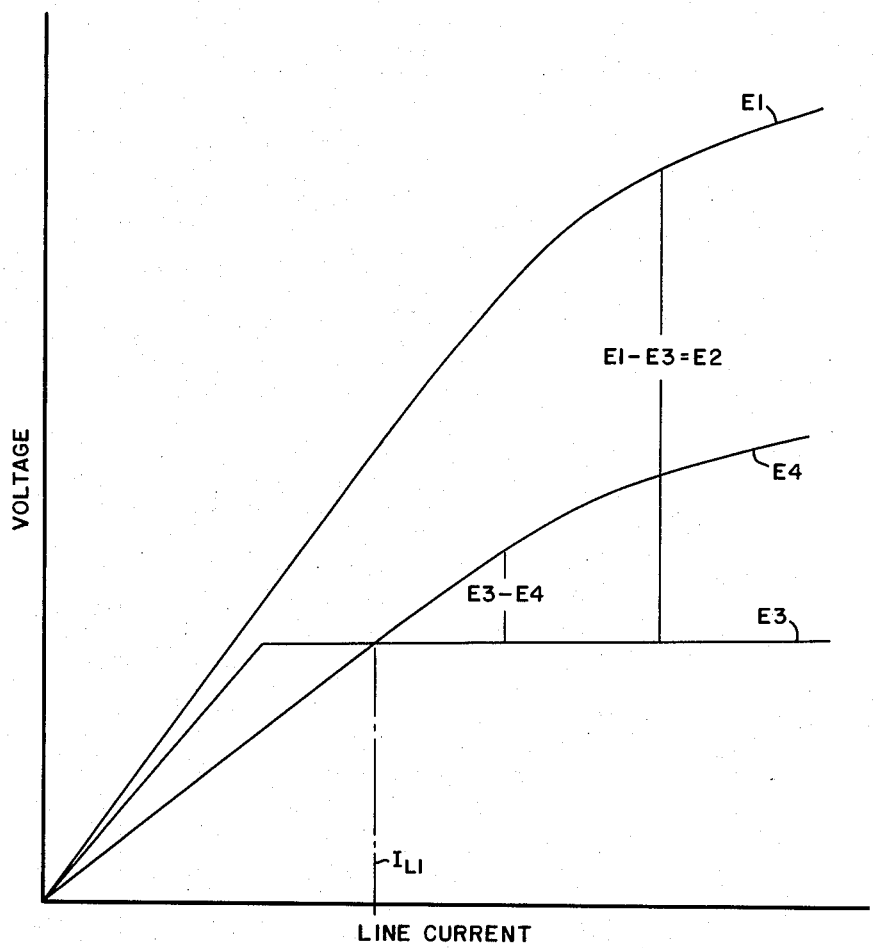
FIGURE 2 is a graphical representation showing relationships between voltages and currents present in the relay assembly of FIGURE 1.

Suitable relationships for the voltages E1, E3 and E4 are shown in FIG. 2 wherein ordinates represent values of voltage and abscissas represent values of line current. The curves E3 and E4 intersect at a value of line current IL1 which is slightly larger than the largest value of load current which is supplied by the transmission line. If no fault is present on the transmission line, the voltage E3 is larger than the voltage E4 and maintains the emitter positive with respect to the base of transistor T4. This maintains the transistor T4 turned-off. Inasmuch as the transistor T5 is turned-on under these circumstances, the capacitor C5 is maintained in ineffective condition.

If a fault occurs on the transmission line, the line current increases to a fault value which is larger than the value of current IL1 corresponding to the intersection of the curves E3 and E4 in FIG. 2. For such a value of line current, the voltage E4 is larger than the voltage E3 and consequently the difference between these voltages maintains the base of the transistor T4 positive with respect to the emitter. The transistor T4 consequently is turned-on to shunt the base-emitter circuit of the transistor T5 through the resistor R22 and the switch SW1. The voltage across the register R22 now maintains the emitter positive with respect to the base of the transistor T5 to assure turn-off of this transistor. Since the transistor T5 now is in its turned-off or blocking condition, the capacitor C5 is in effective condition and receives a charge through its charging circuit at a rate dependent on the size of the capacitor, the adjustment of the resistor R25 and the value of the voltage E2.

When the voltage across the capacitor C5 reaches a predetermined value, it becomes effective for tripping the circuit breaker CB. If the trip coil TC has adequate sensitivity, it may be energized directly by this voltage. However, in the embodiment of FIG. 1 an intervening relay RE which may be of static or electromechancial construction is employed. For present purposes, it will be assumed that the relay RE is of electromechanical construction and that it operates to connect a source of electric energy represented by a battery B across the trip coil TC through the auxiliary switch CB1. The relay has an operating coil which is connected across the capacitor C5 through a threshold device D5 and the switch SW3.

If desired, the threshold device D5 may be a Zener diode. Preferably, however, the threshold device D5 is of a type which breaks over at a predetermined voltage and thereafter remains in conductive condition until the voltage drops substantially below its break over value. The parameters are such that after the threshold device D5 breaks over to pick up the relay RE sufficient current is applied to the operating coil of the relay through the resistors R25 and R26 to maintain the relay in its picked up condition until the circuit breaker CB trips. Such threshold devices are available in the form of PNPN semiconductor devices.

A rectifier D3 is connected across the operating coil of the relay RE to permit discharge of energy stored in the coil when the coil is deenergized.

From the foregoing discussion, it will be clear that the relay assembly as thus far described does not operate for values of line current which are below fault values. Under such circumstances, the transistor T5 is turned-on to prevent a charging operation of the capacitor C5.

When a fault occurs on the transmission line, the transistor T4 is turned-on to place the transistor T5 in blocking condition. This permits a charging operation of the capacitor C5. The voltage across the capacitor C5 increases at a rate which is dependent on the magnitude of the line current. When the voltage exceeds a predetermined value, the threshold device D5 breaks over to pick up the relay RE and trip the circuit breaker CB. The time delay in tripping of the circuit breaker CB is inversely dependent on the magnitude of the line current. The value of line current for which a charging operation is initiated may be adjusted by adjustment of the resistor R4. The time delay in operation of the circuit breaker may be adjusted by adjustment of the resistor R25. The shape of the time curve may be adjusted further by adjustment of the saturation characteristics of the transformer TR1. By these expedients, the time curve for the relay assembly of FIG. 1 may be adjusted to match acceptably a number of the curves shown in the aforesaid bulletin.

For some applications, a time delay longer than that which may be obtained conveniently by the charging of the capacitor C5 alone may be desired. For such applications, the switch SW2 is closed and the switch SW3 is operated to its left-hand position as viewed in FIG. 1. This manipulation of the switches does not affect the charging of the capacitor C5. However, when the voltage across the capacitor C5 now reaches a predetermined value, an additional capacitor C4 is made effective for extending the time delay in tripping.

The capacitor C4 is maintained in ineffective condition as long as a switch, preferably an NPN transistor T2, is in conducting condition. When the transistor T2 is turned-off, the capacitor C4 is in effective condition to receive a charge from the voltage E2 through resistors R29 and R30. The resistor R29 is adjustable for the purpose of adjusting the charging rate of the capacitor C4.

When the transistor T2 is in turned-on condition, it shunts the capacitor C4 through the resistor R30 to prevent charging of the capacitor. It will be noted that the collector of the transistor T2 is connected to the positive terminal of the capacitor C4 through the resistor R30 whereas the emitter of the transistor is connected to the negative terminal of the capacitor. The transistor T2 is maintained in turned-on condition by the voltage E2 which is connected across the base and emitter of the transistor T2 through resistors R27 and R28.

The condition of the transistor T2 is supervised by a switch preferably in the form of a transistor T1. It will be assumed that all transistors employed in the embodiment of FIG. 1 are of the NPN type. When the transistor T1 is turned-on, it establishes a shunt across the base and emitter of the transistor T2 through the resistor R28. This places the transistor T2 in blocking condition and permits charging of the capacitor C4. The collector of the transistor T1 is connected to the base of the transistor T2 through the resistor R28 whereas the emitters of the two transistors are connected together.

The voltage across the capacitor C5 is applied across the base and emitter of the transistor T1 through a threshold device Z3 which conveniently is a Zener diode. When the voltage across the capacitor C5 reaches a value sufficient to break over the Zener diode Z3, current flows through the base-emitter circuit of the transistor T1 to turn-on the transistor. In turning on, the transistor T1 places the transistor T2 in blocking condition and permits charging of the capacitor C4. The voltage across the capacitor C4 is applied to the threshold device D5 and the relay operating coil for the relay RE in series through the switch SW3. Consequently, when the voltage across the capacitor reaches a predetermined value, the threshold device D5 breaks down to permit an operation of a relay RE to trip the circuit breaker CB.

From the foregoing discussion follows that the capacitor C5 and C4 introduce successive time delays. Preferably, a major portion of the total time delay is introduced by the charging of the capacitor C5. The capacitor C4 preferably charges rapidly to a value sufficient to produce a tripping operation. Because of the relatively rapid charge of the capacitor C4 a relatively rapid or trigger operation of the relay RE results therefrom.

For some applications, it is desirable that the tripping operation of the circuit breaker CB be permitted only if the direction of power flow in the transmission line is in a predeterminned or tripping direction. Such supervision of the tripping operation may be incorporated by opening the switch SW1 which places a switch T6 in series with the output circuit of the transistor T4. Unless the switch T6 is in closed condition, the transistor T4 cannot place the transistor T5 in blocking condition to permit charging of the capacitor C5. Preferably, the switch T6 is a transistor which is illustrated as an NPN type. The collector-emitter circuits of the two transistors T4 and T6 are in series.

The base and emitter of the transistor T6 are connected across one diagonal of a ring modulator D6 through a rectifier D7. The secondary winding of the transformer TR3 is connected across the same diagonal of the ring modulator through coupling capacitors C6 and C7.

The remaining diagonal of the ring modulator D6 is connected across the secondary winding of a voltage transformer VT through resistors R10 and R11. The primary winding of the voltage transformer VT is connected for energization in accordance with the voltage across the line conductors L1 and L2.

The output of the ring modulator D6 is a direct voltage having a polarity dependent on the direction of power flow in the transmission line. This direct voltage is applied across the base and emitter of the transistor T6 through the rectifier D7. If the power flow in the transmission line is in a tripping direction, the output of the ring modulator maintains the base of the transistor T6 positive relative to the emitter and maintains this transistor in its turned-on condition. This permits a tripping operation of the circuit breaker. If the flow of power is in a non-tripping direction, the polarity of the output voltage of the ring modulator is reversed and the transistor T6 remains in a blocking condition to prevent a tripping operation of the relay assembly.

If desired, the rectifier D7 may be omitted. Preferably, it is employed to prevent the application of a substantial back voltage across the emitter and base junction of the transistor T6. A suitable filter represented by a capacitor C8 is provided for the output of the ring modulator D6 in order to remove ripple from this output.

The overall operation of the relay assembly now will be considered. As long as the flow of power in the transmission line is in the non-tripping direction, the output of the modulator D6 has a polarity which maintains the transistor T6 in blocking condition to prevent a tripping operation of the circuit breaker.

If the flow of power is in the tripping direction, the polarity of the output of the ring modulator is such that the transistor T6 is maintained in its turned-on or conducting condition. This prepares the relay assembly for a tripping operation.

As long as the line current is in the normal load range of the transmission line, the voltage E2 directs a current through the resistors R23 and R22 and through the base and emitter of the transistor T5 to maintain the transistor in its turned-on condition. This renders the capacitor C5 ineffective for receiving a charge and the circuit breaker CB remains closed. For this condition, the reference voltage E3 is larger than the operating voltage E4 and the difference E4 minus E3 has a polarity which maintains the transistor T4 in its blocking condition.

If a fault occurs on the transmission line and the flow of power continues to be in the tripping direction, the voltage E4 increases to a value larger than that of the reference voltage E3. The difference between these voltages now has a polarity which turns on the transistor T4. Since the transistors T4 and T6 now are both in conducting condition, the transistor T5 is turned-off to permit a charging operation of the capacitor C5. This capacitor then charges at a rate which is dependent on the difference E2 between the voltages E1 and E3 and this difference in turn is dependent on the magnitude of the fault current in the transmission line.

The voltage across the capacitor C5 starts to build up. At the end of a time delay which varies inversely with the magnitude of the line current, the voltage across the capacitor C5 becomes large enough to break over the Zener diode Z3 and current now flows through the base-emitter circuit of the transistor T1 to turn on this transistor. Upon turning on the transistor T1 places the transistor T2 in blocking condition to permit a charging operation of the capacitor C4. This capacitor also charges at a rate dependent on the fault current. At the end of a time interval which varies inversely with the magnitude of the fault current, the voltage across the capacitor C4 becomes sufficient to break over the diode D5. Current now flows through the coil of the relay RE and this relay picks up to trip the circuit breaker CB.

The opening of the circuit breaker CB terminates the flow of line current. The capacitors C4 and C5 now discharge through the resistors connected thereacross. This completes a cycle of operation of the relay assembly.

Although the invention has been described with reference to certain specific embodiments thereof, numerous modifications falling within the spirit and scope of the invention are possible.

I claim as my invention:

1. In a protective relay assembly, a pair of terminals, means for deriving from current supplied to the pair of terminals a first direct voltage having a magnitude dependent on the magnitude of current flowing through the pair of terminals over a substantial range of variation of the magnitude of said current, means for deriving from current supplied to said pair of terminals a second direct voltage, having a magnitude which is substantially constant over said range of variation, a capacitor, circuit means connecting the capacitor for energization in accordance with the first direct voltage, said circuit means including substantial resistance whereby the circuit means and capacitor provide a time-delay circuit, controllable disabling means rendering said capacitor ineffective for receiving a charge through said circuit means, effectuating means responsive to a predetermined relation between the first and second direct voltages for controlling the disabling means to condition the capacitor to receive charge from said circuit means and translating means responsive to the voltage across said capacitor.

2. In a protective relay assembly, a pair of terminals, means for deriving from current supplied to the pair of terminals a first direct voltage having a magnitude dependent on the magnitude of current flowing through the pair of terminals over a substantial range of variation of the magnitude of said current, means for deriving from current supplied to said pair of terminals a second direct voltage, having a magnitude which is substantially constant over said range of variation, a capacitor, circuit means connecting the capacitor for energization in accordance with the first direct voltage, said circuit means including substantial resistance whereby the circuit means and capacitor provide a time-delay circuit, controllable disabling means rendering said capacitor ineffective for receiving a charge through said circuit means, effectuating means responsive to a predetermined relation between the first and second direct voltages for controlling the disabling means to condition the capacitor to receive charge from said circuit means and translating means responsive to the voltage across said capacitor, said translating means comprising a circuit energized in accordance with the voltage across said capacitor and including a threshold device, said threshold device having a characteristic which offers a substantial blocking resistance to the flow of current until the voltage thereacross reaches a predetermined threshold value at which the threshold device breaks over to offer an unblocked resistance to the flow of current which is much smaller than said blocking resistance, said threshold device after breaking over retaining said unblocked resistance until the voltage thereacross drops substantially below said threshold value.

3. In a protective relay assembly, a first pair of terminals, means for deriving from current supplied to the pair of terminals a first direct voltage having a magnitude dependent on the magnitude of current flowing through the pair of terminals over a substantial range of variations of the magnitude of said current, means for deriving from current supplied to said pair of terminals a second direct voltage having a magnitude which is substantially constant over said range of variation, a capacitor, circuit means connecting the capacitor for energization in accordance with the first direct voltage, said circuit means including substantial resistance whereby the circuit means and capacitor provide a time-delay circuit, controllable disabling means rendering said capacitor ineffective for receiving a charge through said circuit means, said disabling means comprising a transistor having its emitter-collector circuit shunting said capacitor, and means energized from said pair of terminals for turning on said transistor to shunt effectively said capacitor, means responsive to the difference between said first and second direct voltages for turning off said transistor to condition the capacitor for a charging operation, and translating means responsive to the voltage across said capacitor.

4. In a protective relay assembly, a pair of terminals, a capacitor, circuit means connecting the capacitor for energizing by direct current in dependence on the energization of said terminals, said circuit means including substantial resistance whereby said circuit means and capacitor constitute a time-delay circuit, a threshold device having a substantial blocking resistance thereacross, said threshold device being responsive to voltage thereacross in excess of a threshold value for breaking over to exhibit an unblocking resistance thereacross which is much smaller than said blocking resistance, said threshold device after breaking over retaining said unblocking resistance until the voltage thereacross drops substantially below said threshold value, and translating means connected for energization in accordance with the voltage across said capacitor through the threshold device, said translating means being in unoperated condition while said threshold device offers said blocking resistance, and operating when the voltage across said capacitor reaches a value sufficient to break over said threshold device, said circuit means passing sufficient current through the threshold device while broken over to maintain the translating means in operated condition.

5. In a protective relay assembly, a pair of terminals, a first capacitor, first circuit means connecting the capacitor for energization by direct current in dependence on the energization of said terminals, said circuit means including substantial resistance, said circuit means and capacitor constituting a first time delay circuit, a second capacitor, second circuit means connecting the second capacitor for energization by direct current in dependence on the voltage across said first capacitor, said second circuit means including substantial resistance, said second circuit means and second capacitor constituting a second time delay circuit, and translating means responsive to the voltage across said second capacitor.

6. In a protective relay assembly, a pair of terminals, a first capacitor, first circuit means connecting the capacitor for energization by direct current in dependence on the energization of said terminals, said circuit means including substantial resistance, said circuit means and capacitor constituting a first time delay circuit, a threshold device having a substantial blocking resistance which changes to a relatively low non-blocking resistance in response to increase of voltage across the threshold device above a predetermined value connected for energization in accordance with the voltage across said capacitor, a second capacitor, second circuit means connecting the second capacitor for energization by direct current in dependence on the transfer of said threshold device from a blocking to a non-blocking resistance by the voltage across said first capacitor, said second circuit means including substantial resistance, said second circuit means and second capacitor constituting a second time delay circuit, and translating means responsive to the voltage across said second capacitor.

7. In a protective relay assembly, a pair of terminals, a first capacitor, first circuit means connecting the capacitor for energization by direct current in dependence on the energization of said terminals, said circuit means including substantial resistance, said circuit means and capacitor constituting a first time delay circuit, a transistor having an emitter-collector circuit shunting said capacitor means controlling said transistor to be in a turned-on condition, means responsive to a predetermined energization of said terminals for turning said transistor off to permit charging of said capacitor, a second capacitor, second circuit means for connecting the second capacitor for energization by direct current in dependence on the voltage across said first capacitor, said second circuit means including substantial resistance, said second circuit means and second capacitor constituting a second time delay circuit, a second transistor having an emitter-collector circuit shunting said second capacitor, means controlling the second transistor to be in turned-on condition, means responsive to a predetermined voltage across said first capacitor for turning said second transistor off to permit charging of the second capacitor, and translating means responsive to the voltage across said second capacitor.

8. In a protective relay assembly, a pair of terminals, a first capacitor, first circuit means connecting the capacitor for energization by direct current in dependence on the energization of said terminals, said circuit means including substantial resistance, said circuit means and capacitor constituting a first time delay circuit, a transistor having an emitter-collector circuit shunting said capacitor, means controlling said transistor to be in a turned-on condition, means responsive to a predetermined energization of said terminals for turning said transistor off to permit charging of said capacitor, a threshold device having a substantial blocking resistance which changes to a relatively low non-blocking resistance in response to increase of voltage across the threshold device above a predetermined value connected for energization in accordance with the voltage across said capacitor, a second capacitor, second circuit means connecting the second capacitor for energization by direct current in dependence on the device from a blocking to a non-blocking resistance by the voltage across said first capacitor, said second circuit means including substantial resistance, said second circuit means and second capacitor constituting a second time delay circuit, a second transistor having an emitter collector circuit shunting said second capacitor, means controlling the second transistor to be in turned-on condition, said threshold device being connected in the base-emitter circuit of the second transistor to turn the second transistor off in response to transfer of the threshold device from blocking to non-blocking resistance, and translating means responsive to the voltage across said second capacitor.

9. In a protective relay assembly, a first pair of terminals, a second pair of terminals, a first magnitude dependent protective relay unit connected to the first pair of terminals for operation from a first condition to a second condition in dependence on the magnitude of the energization of the first pair of terminals, a second protective relay unit connected for operation from a first condition to a second condition in dependence on a predetermined energization of said terminals, first and second transistors each having an output circuit controlled by an input circuit, means connecting the input circuit of the first transistor for energization in dependence on energization of said first terminals, means connecting the input circuit of the second transistor for energization in dependence on the condition of the second relay unit, and means controlled by the two output circuits of said transistors in AND configuration for controlling the effectiveness of the first relay unit.

References Cited in the file of this patent
UNITED STATES PATENTS
2,981,867    Hopkins et al. _____ Apr. 25, 1961